(12) United States Patent
Rawlinson

(10) Patent No.: US 6,672,568 B1
(45) Date of Patent: Jan. 6, 2004

(54) WINCH ASSEMBLY FOR A TRACTOR

(76) Inventor: Richard J. Rawlinson, P.O. Box 281, Cushing, TX (US) 75760

( * ) Notice: Subject to any disclaimer, the term of this patent is extended or adjusted under 35 U.S.C. 154(b) by 0 days.

(21) Appl. No.: 10/171,341

(22) Filed: Jun. 13, 2002

(51) Int. Cl.[7] .................................................. B66D 1/00
(52) U.S. Cl. ....................................................... 254/323
(58) Field of Search ........................................ 254/323

(56) References Cited

U.S. PATENT DOCUMENTS

| | | | | |
|---|---|---|---|---|
| 2,959,396 A | * | 11/1960 | Lawrence | .................... 254/273 |
| 3,739,928 A | * | 6/1973 | Randall | ...................... 254/327 |
| 3,788,605 A | * | 1/1974 | Johnson | ...................... 254/361 |
| 4,093,034 A | | 6/1978 | Curley et al. | |
| 4,337,926 A | * | 7/1982 | Dehaan | ....................... 254/365 |
| 4,358,088 A | | 11/1982 | House et al. | |
| 4,555,092 A | * | 11/1985 | Overholt | ...................... 254/291 |
| 4,566,674 A | * | 1/1986 | Ebey et al. | ................. 254/345 |
| 4,650,163 A | * | 3/1987 | Peterson | ...................... 254/327 |
| 4,854,547 A | * | 8/1989 | Oliphant | ..................... 254/271 |
| 5,217,127 A | | 6/1993 | Rodriquez | |
| 5,913,507 A | | 6/1999 | Lauricella, Jr. | |
| 6,138,991 A | | 10/2000 | Myers, Jr. | |
| 6,386,514 B1 | * | 5/2002 | Ray | ............................ 254/323 |
| 6,460,907 B2 | * | 10/2002 | Usui | .......................... 293/115 |
| 6,494,437 B1 | * | 12/2002 | Boyer | ........................ 254/323 |
| 6,511,089 B1 | * | 1/2003 | Kores, Sr. | ................ 280/478.1 |
| 6,523,806 B2 | * | 2/2003 | Bartal | ........................ 254/323 |

* cited by examiner

*Primary Examiner*—Emmanuel M. Marcelo
(74) *Attorney, Agent, or Firm*—Dale J. Ream

(57) ABSTRACT

A winch assembly for use with a tractor having a power take off ("PTO") includes a winch framework releasably coupled to a rear portion of the tractor. The winch framework does not inhibit connection of an implement to a three point or drawbar hitch of the tractor. A winch having a cable reel is mounted in the winch framework and coupled to the PTO such that the cable-reel may unwind or retract a cable upon PTO operation. The winch framework may be released from the rear portion of the tractor and coupled to a storage frame mounted elsewhere on the tractor when the winch is not in use. While the winch may be connected to the PTO and used without uncoupling an implement from the tractor, the winch must be removed in order to actively couple the implement to the PTO.

18 Claims, 12 Drawing Sheets

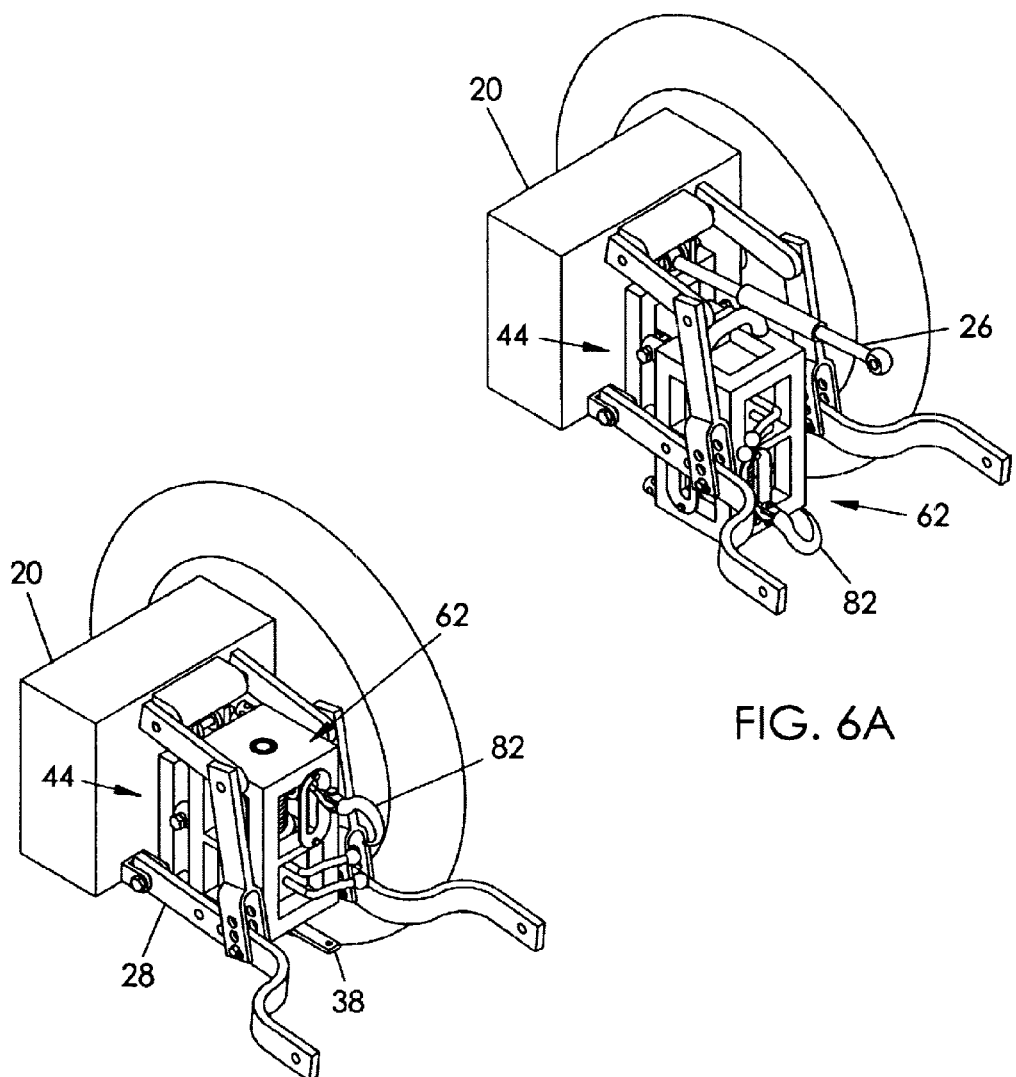
FIG. 6A
FIG. 6B
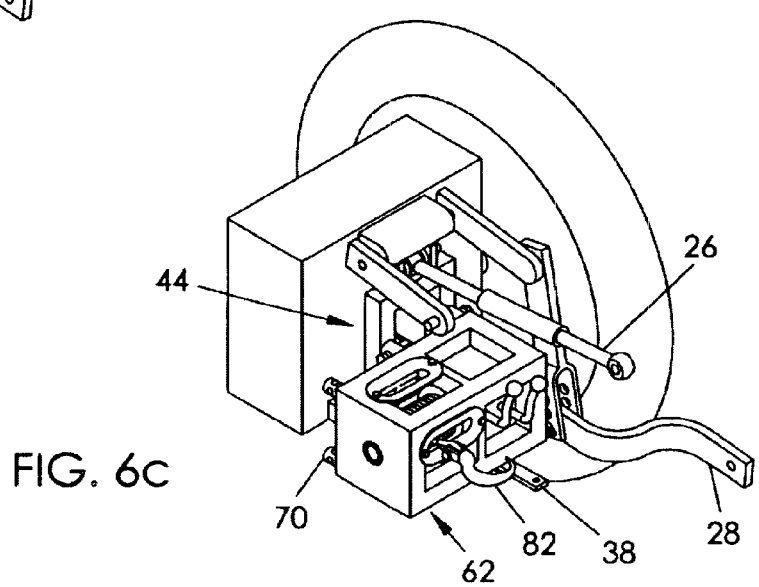
FIG. 6C

WINCH ASSEMBLY FOR A TRACTOR

BACKGROUND OF THE INVENTION

This invention relates generally to winches and, more particularly, to a winch assembly that may be connected to a rear portion of a farm type tractor and operated without disconnecting an implement or accessory already coupled to the tractor.

A common situation for a tractor user is to get stuck in the mud while using a tractor accessory or implement in a field. This situation usually requires that the user walk a considerable distance back to house, barn, or vehicle to retrieve a winch that may be used to pull the tractor out of the mud. In fact, the user typically must bring another tractor or vehicle back to the site for use in pulling the stuck tractor out of the mud.

Various winch assemblies are known in the art for attachment and use with vehicles and tractors. Although assumably effective for their intended purposes, existing winch assemblies do not connect directly to the rear of a tractor for operation by the tractor's power take off ("PTO") and without requiring the tractor accessory or implement to be uncoupled from the tractor.

Therefore, it is desirable to have a winch assembly that may be mounted for use to the rear portion of a tractor without obstructing connection of a tractor accessory to the tractor's three point hitch or drawbar hitch. Further, it is desirable to have a winch assembly that may be mounted for storage at a location on the tractor displaced from the rear portion. In addition, it is desirable to have a winch assembly that may be coupled to and driven by the tractor's PTO without uncoupling an accessory or implement that is already coupled to the tractor.

SUMMARY OF THE INVENTION

Accordingly, the present invention includes a winch assembly for use with a tractor of a type having a power take off ("PTO") and a three point or drawbar hitch mounted to a rear portion of the tractor. The winch assembly includes a winch framework having a winch frame releasably attached to a mounting frame. The mounting frame may be coupled to upper and side brackets that are already mounted to the tractor for use with respective arms of a three point hitch. While the mounting frame may be releasably connected to these tractor brackets, it is expected that the mounting frame will remain attached thereto even when the winch frame itself is disconnected for storage purposes. A winch having a cable-reel with gear linkage is mounted within the winch frame, the gear linkage including a PTO connector for connection to the tractor's PTO. The winch frame is releasably coupled to the mounting frame when use of the winch is needed. The entire winch framework is configured so as not to interfere with or obstruct the connection between the tractor accessory and the three point or drawbar hitch to which the accessory is coupled. However, the accessory driveshaft must be uncoupled from the PTO so that the winch assembly PTO connector may be coupled to the PTO.

In use, a free end of a cable that may be wound about the cable-reel includes a fastener and may be attached to an object spaced from the tractor, e.g. a tree. Then, the cable-reel may retract the cable upon operation of the tractor's PTO so as to pull the tractor toward the spaced object. When use of the winch is no longer needed, the PTO connector may be disengaged from the PTO and the winch frame may be released from the mounting frame and stored elsewhere on the tractor. When the accessory driveshaft is again coupled to the PTO, the tractor user is once again ready to continue using the accessory.

Therefore, a general object of this invention is to provide a winch assembly that may be releasably coupled to a rear portion of a tractor without interfering with or obstructing a connection between a tractor implement or accessory and the three point or drawbar hitch to which it is coupled.

Another object of this invention is to provide a winch assembly, as aforesaid, which may be connected to a tractor's PTO and operated thereby without uncoupling a tractor accessory from its connection to a tractor's hitch.

Still another object of this invention is to provide a winch assembly, as aforesaid, which may be mounted for storage at another location on the tractor when not in use.

Yet another object of this invention is to provide a winch assembly, as aforesaid, which may be operatively connected to a tractor's PTO when an accessory's driveshaft is disconnected from the PTO.

A further object of this invention is to provide a winch assembly, as aforesaid, in which the winch frame may be oriented horizontally or vertically relative to the mounting frame such that the winch cable may be extended or retracted from a desired configuration.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 6A is a perspective view of the winch assembly as in FIG. 1 with the winch frame mounted in a cable-reel-low configuration;

FIG. 6B is a perspective view of the winch assembly as in FIG. 1 with the winch frame mounted in a cable-reel-high configuration;

FIG. 6C is a perspective view of the winch assembly as in FIG. 1 with the winch frame mounted in a cable-reel-side configuration;

DESCRIPTION OF THE PREFERRED EMBODIMENT

Figure 1:
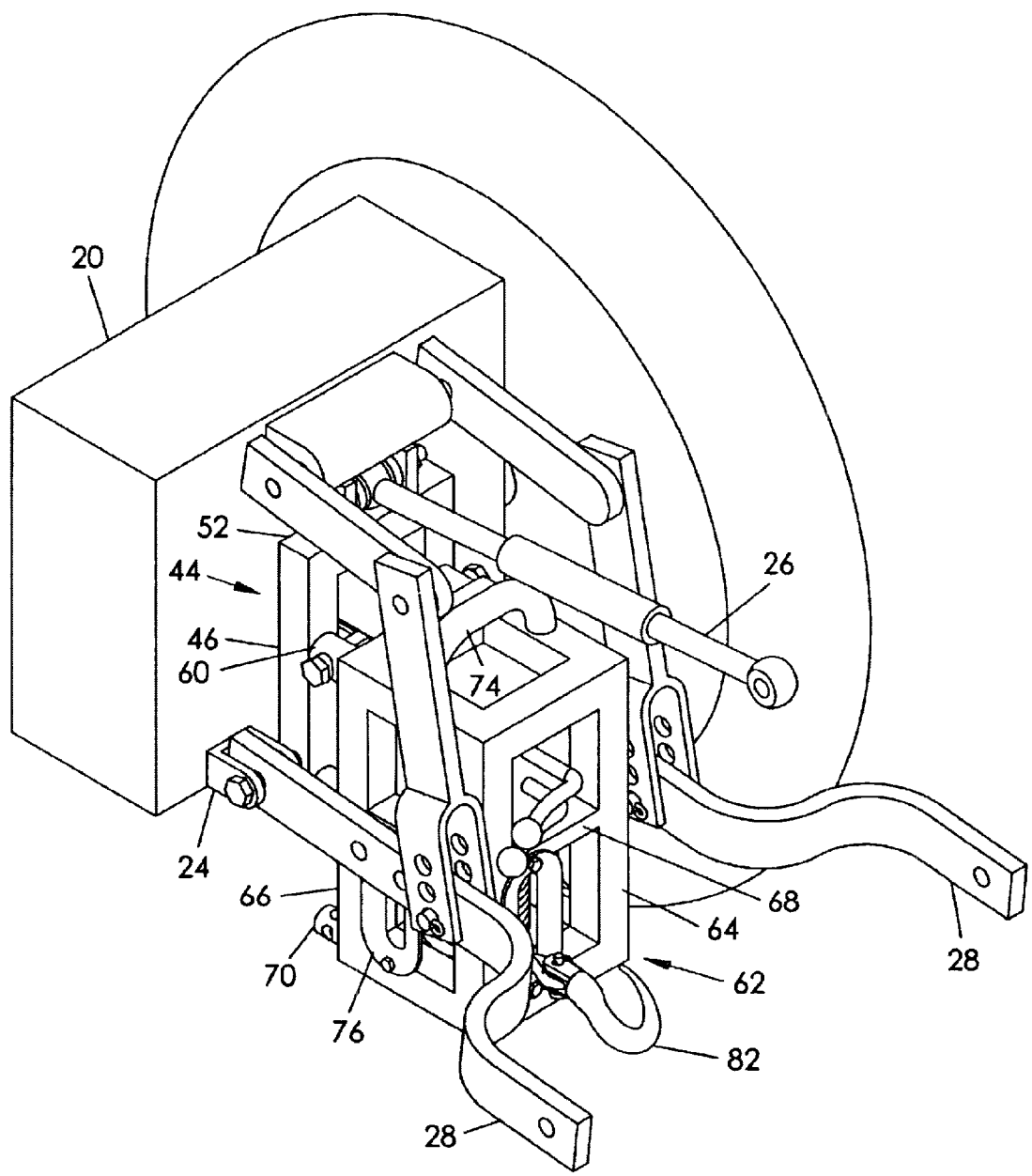
FIG. 1 is a perspective view of a winch assembly according to one embodiment of the present invention mounted to a rear portion of a farm type tractor.

A winch assembly for use with a farm type tractor according to the present invention will now be described in detail with reference to claims 1 through 12 of the accompanying drawings. A winch assembly 10 according to one embodiment of the invention is illustrated particularly in FIGS. 1 through 10 and includes a winch framework that may be releasably coupled to a rear portion 20 of a farm type tractor. More particularly, the winch assembly 10 is configured for attachment to the upper 22 and pair of side 24 brackets that are typically found on the rear portion 20 of a tractor for connection of respective arms 26, 28 of a three point hitch (FIG. 1). The winch assembly 10 could alternatively be configured for attachment to a tractor's drawbar hitch 38 (drawbar shown in FIGS. 6B and 6C).

Figure 2:
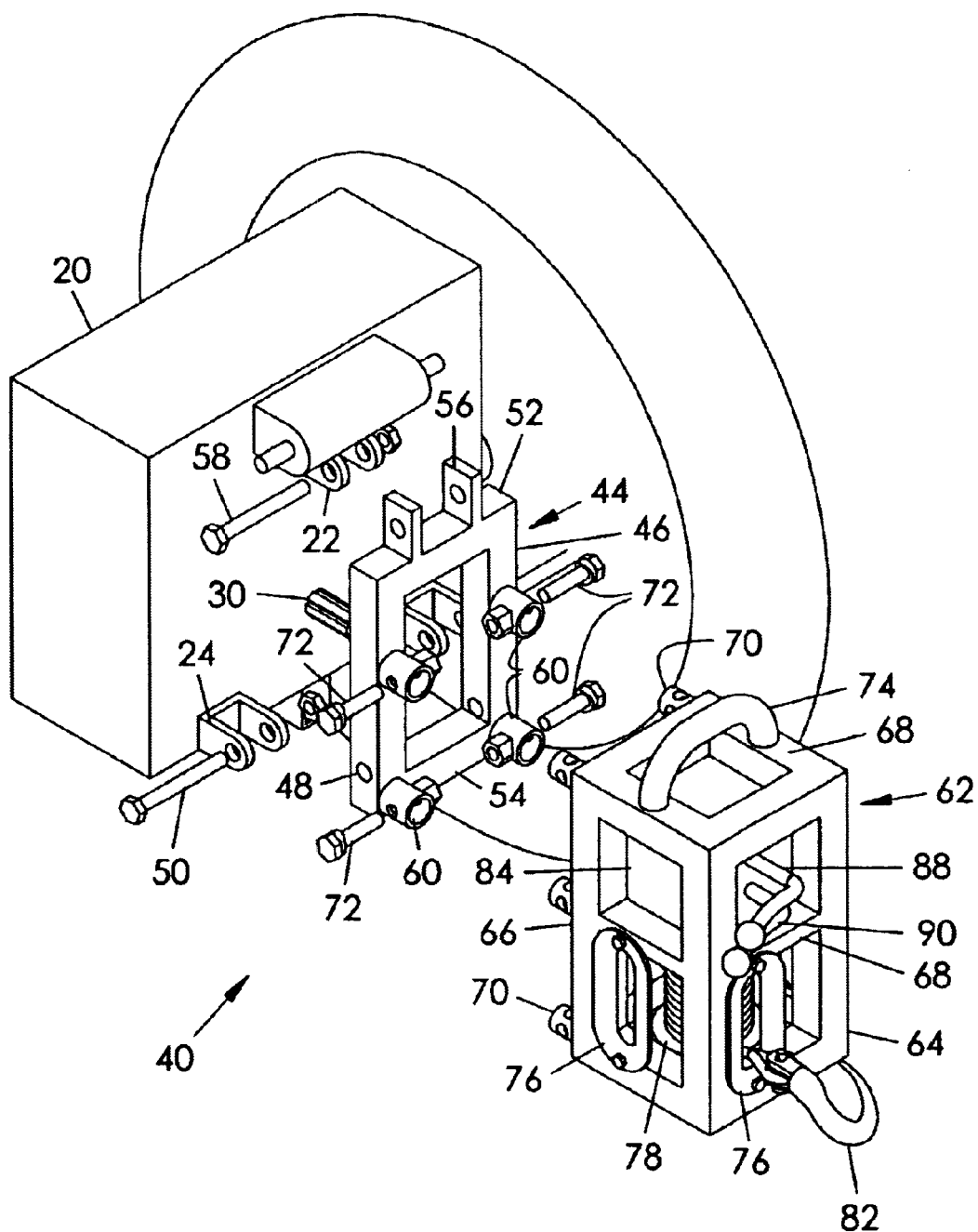
FIG. 2 is an exploded view of the winch assembly as in FIG. 1.
Figure 3:
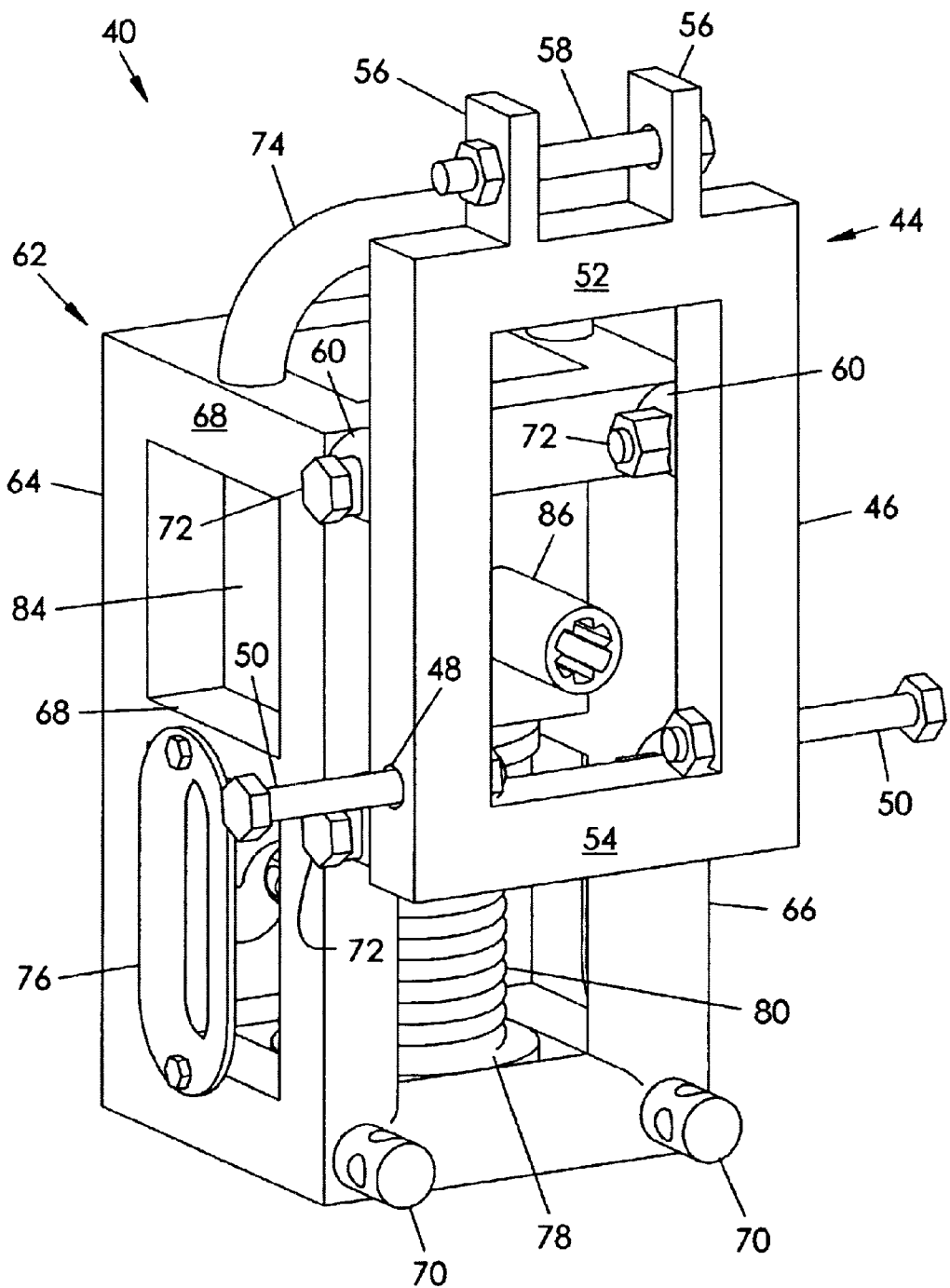
FIG. 3 is a reverse perspective view of the winch assembly as in FIG. 1 removed from the tractor.
Figure 4:
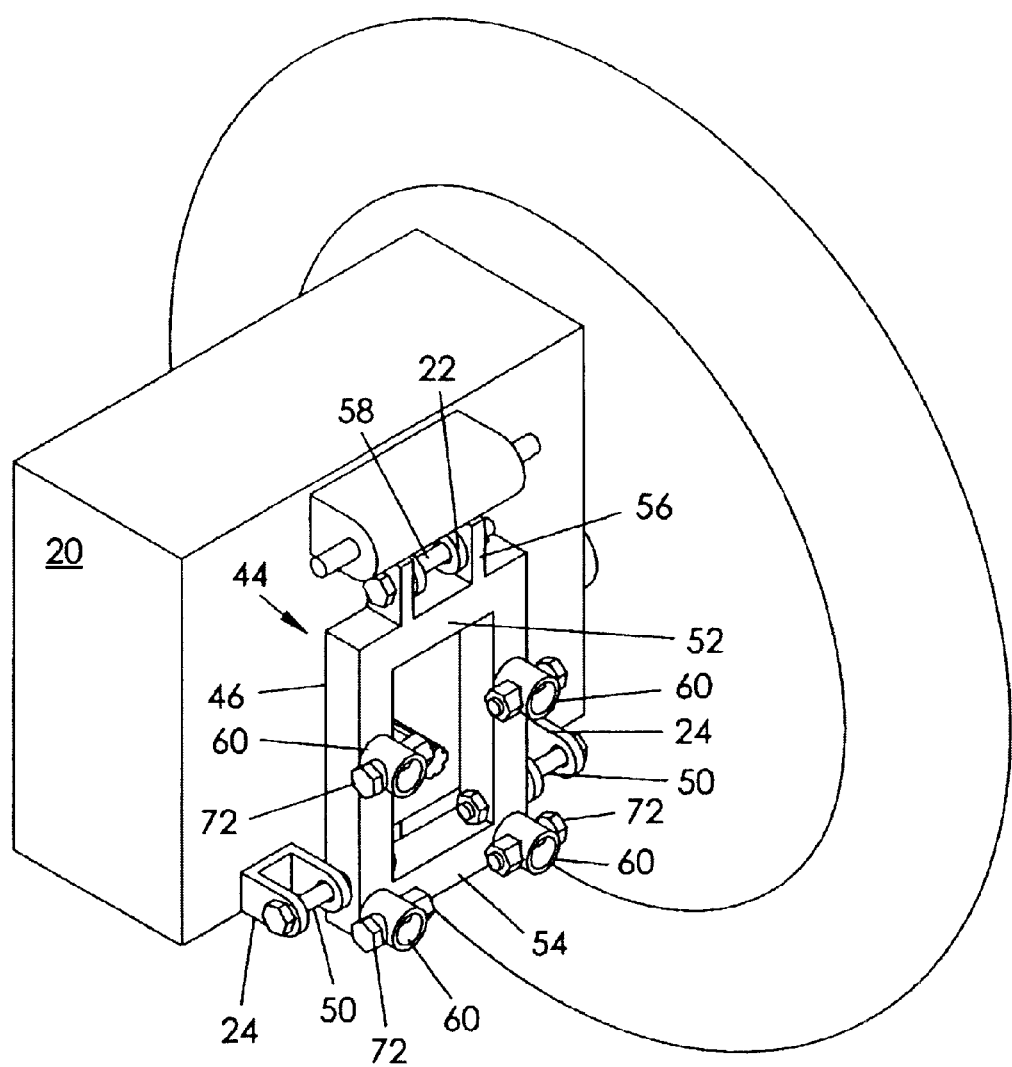
FIG. 4 is a perspective view as in FIG. 1 with the three point hitch arms and winch frame removed.

The winch framework includes a winch frame 62 and a mounting frame 44 (FIG. 3). The mounting frame 44 includes a pair of spaced apart side frame bars 46 with upper 52 and lower 54 frame bars extending between respective side frame bars 46 in a generally rectangular configuration. A pair of upstanding flanges 56 are fixedly attached to the upper frame bar 52, each flange defining an aperture such that said flanges 56 may be releasably coupled to an upper three point hitch bracket 26 with a bolt 58 or other suitable fastener (FIG. 2). The side frame bars 46 also define bores 48 enabling the side frame bars 46 to be releasably coupled to respective side three point hitch brackets 24 with bolts 50 (FIG. 4). Further, the winch frame 62 includes a plurality of couplings 60 mounted to front surfaces of respective side frame bars 46 for connecting the winch frame 62 to the mounting frame 44 as to be described more fully below.

The winch frame 62 includes a pair of rear support members 66 and a pair of front support members 64 with a plurality of struts 68 extending between respective support members (FIGS. 2 and 3). A plurality of bosses 70 are fixedly attached to rear surfaces of the rear support members 66 and are configured so as to selectively mate with corresponding couplings 60 on the mounting frame 44. The bosses 70 may be releasably retained in respective couplings 60 with bolts 72, pins, or the like. Therefore, the winch frame 62 may be releasably coupled to the mounting frame 44 (FIG. 3). A handle 74 is fixedly attached to spaced apart struts that connect upper ends of respective front and rear support members such that the winch frame 62 may be transported by a user. It is understood that another handle (not shown) may be similarly attached to bottom struts.

A winch is mounted within the winch frame 62. More particularly, the winch includes a cable-reel 78 rotatably mounted within the winch frame 62 and includes a cable 80 that may be extended from or retracted about the cable-reel 78. A fastening means such as a hook 82 is connected to a free end of the cable 80 (FIG. 2) for attachment to an object spaced from the winch assembly 10, e.g. a tree. The winch also includes a gearbox 84 mounted within the winch frame 62 which includes a conventional gear linkage (not shown) for operation of the cable-reel 78. A primary PTO connector 86 extends from the gearbox 84 and is configured for connection to the PTO 30 of a tractor. The primary PTO connector 86 is coupled to the gear linkage which, in turn, is connected to the cable-reel 78, whereby the cable-reel 78 is rotated upon an operation of the PTO 30.

Preferably, the gear linkage includes a worm gear (not shown) linking the cable-reel 78 to the primary PTO connector 86 for non-backdrivable operation of the cable-reel 78. A line-force clutch lever 88 allows a user to selectively engage or disengage the worm gear from the primary PTO connector 86. Further, a freespool lever 90 is connected to the gear linkage and extends from the gearbox 84, an operation of which releases the cable 80 and allows the cable-reel 78 to rotate freely.

A plurality of fairleads 76 are attached to the winch frame 62 and extend between respective struts 68 adjacent the cable-reel 78 for guiding the cable 80 onto or from the cable-reel 78 in operation. A fairlead 76 is provided on each side of the winch frame 62 in that the cable 80 may extend therefrom in a desired direction. This configuration is in recognition that an object to which the cable 80 is to be fastened may be to the front, side, or rear of the cable-reel and thus the winch frame 62 needs to accommodate directional choices. Each fairlead 76 includes an inwardly beveled or recessed configuration such that the cable 80 moves smoothly over its surface during use.

Figure 5:
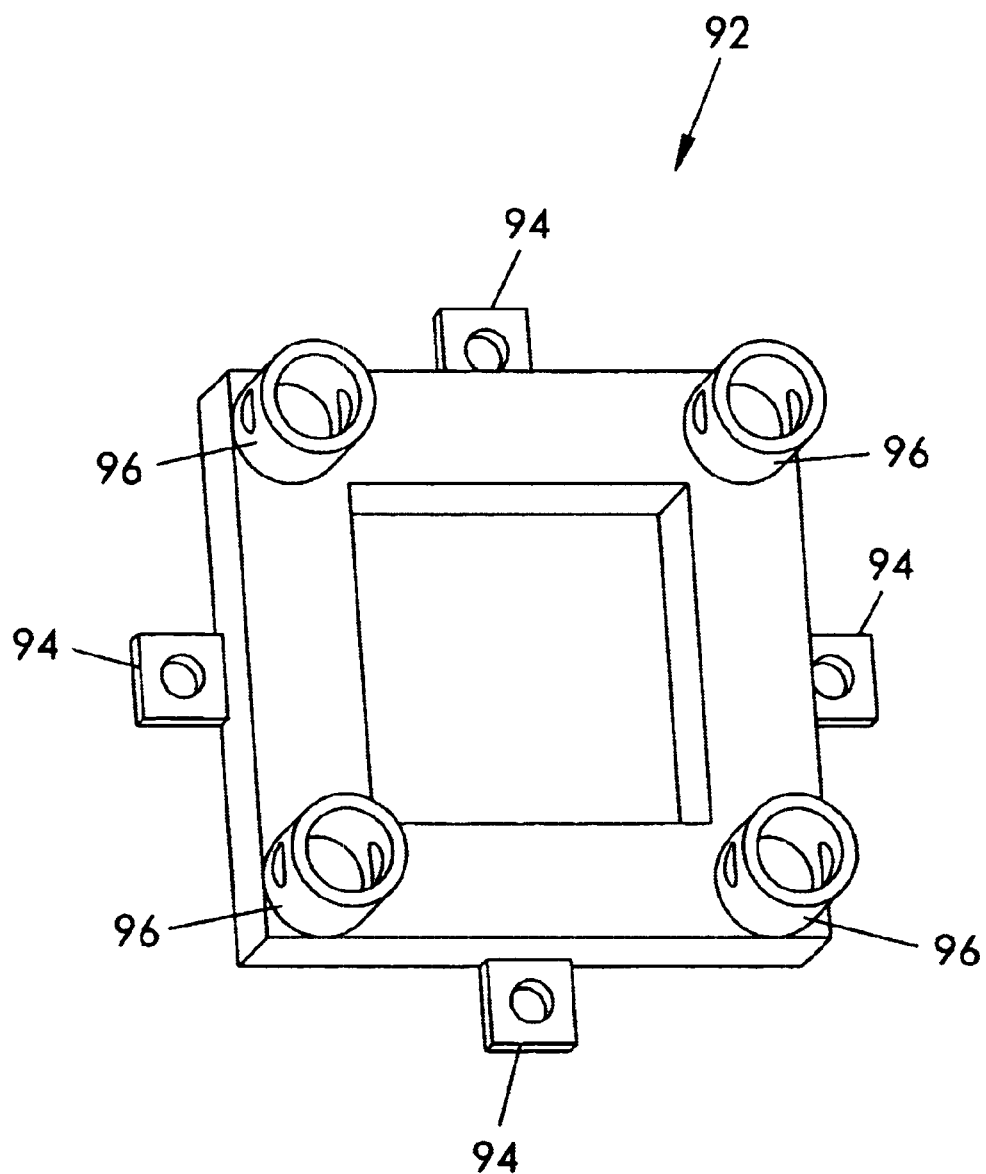
FIG. 5 is a perspective view of the mounting frame of the winch assembly of FIG. 1.

The winch assembly 10 further includes a storage frame 92 having frame members arranged in a generally square configuration (FIG. 5). The storage frame 92 includes a plurality of tabs 94, each tab defining an aperture through which a mounting bolt may be extended. Therefore, the storage frame 92 may be releasably mounted to a tractor at a location spaced apart from the rear portion 20 thereof. For example, the storage frame 92 may be mounted to the tractor adjacent its tool box, to the front end, or to any other suitable location. Another plurality of couplings 96 are fixedly attached to front surfaces of the frame members of the storage frame 92, these couplings being capable of receiving and retaining respective bosses 70 of the winch frame 62 in the manner previously described. Therefore, the winch frame 62 may be coupled to the storage frame 92 for storage when the winch is released from its connection to the mounting frame 44.

Figure 7A:
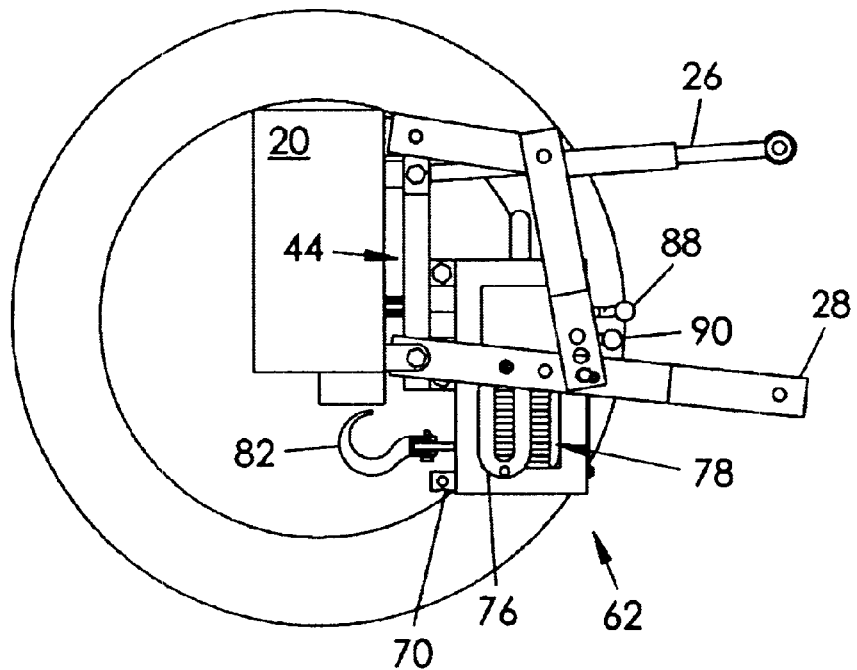
FIG. 7A is a side view of the winch assembly as in FIG. 1 with a cable of the cable-reel extending rearwardly from the cable-reel.
Figure 7B:
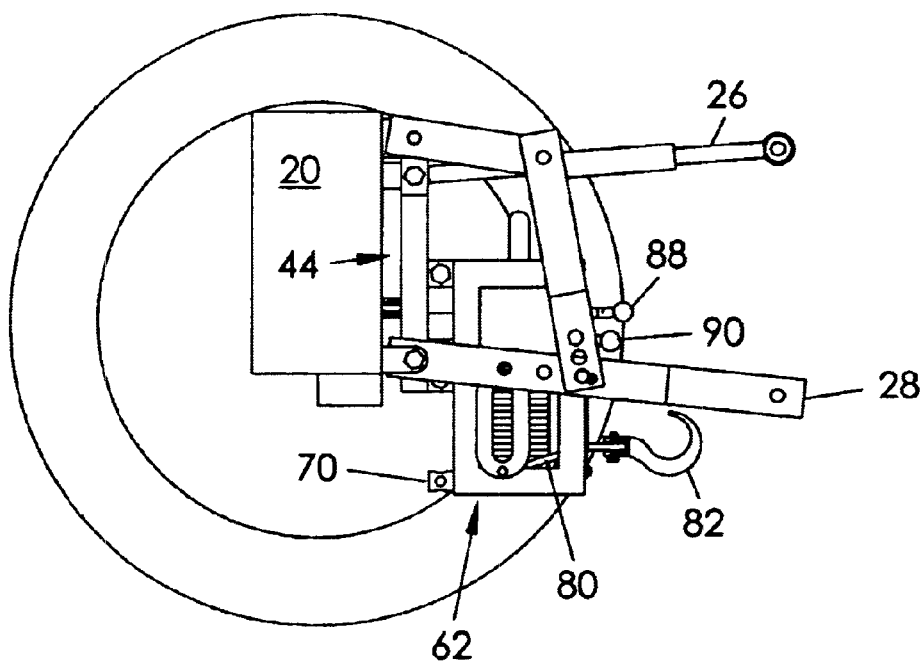
FIG. 7B is a side view of the winch assembly as in FIG. 1 with a cable of the cable-reel extending frontwardly from the cable-reel.

It should be appreciated that the winch frame 62 may be releasably coupled to the mounting frame 44 in several different configurations such that the cable 80 may be extended and retracted from selected high/low/side orientations (FIGS. 6A through 6C). The orientation of a winch is important in certain situations depending on the locations of encountered load forces. The winch framework may be selectively oriented due to the symmetric configuration of the bosses 70 and couplings 60 relative to the PTO 30. More particularly, FIG. 6A illustrates the winch frame 62 coupled to the mounting frame 44 in a "cable-reel low" configuration. The low cable-reel configuration is advantageous when the free end of the cable 80 is connected to a distant object that is at a higher elevation than the cable-reel 78 for the purpose of pulling the tractor out of a stuck situation. In this configuration, the cable 80 may be, extended and retracted in either a frontward (FIG. 7B) or rearward direction (FIG. 7A). FIG. 6B illustrates a "cable-reel high" configuration which is advantageous when the free end of the cable 80 is connected to a distant object that is lower than the cable-reel 78, i.e. where the winch is used to pull another object like a log or another vehicle. Therefore, the winch assembly 10 is versatile in that it can winch both itself and other objects simply by adjusting the position of the winch frame 62 relative to the mounting frame 44. A sideways orientation as shown in FIG. 6C may be advantageous depending on the position of the tractor relative to the distant object to which the cable 80 needs to be attached. Using the winch assembly 10 in this configuration may require removal of one of the three point hitch arms 28. It should be appreciated that using the correct winch configuration reduces the risk of tipping the tractor during a winching operation.

Figure 8B:
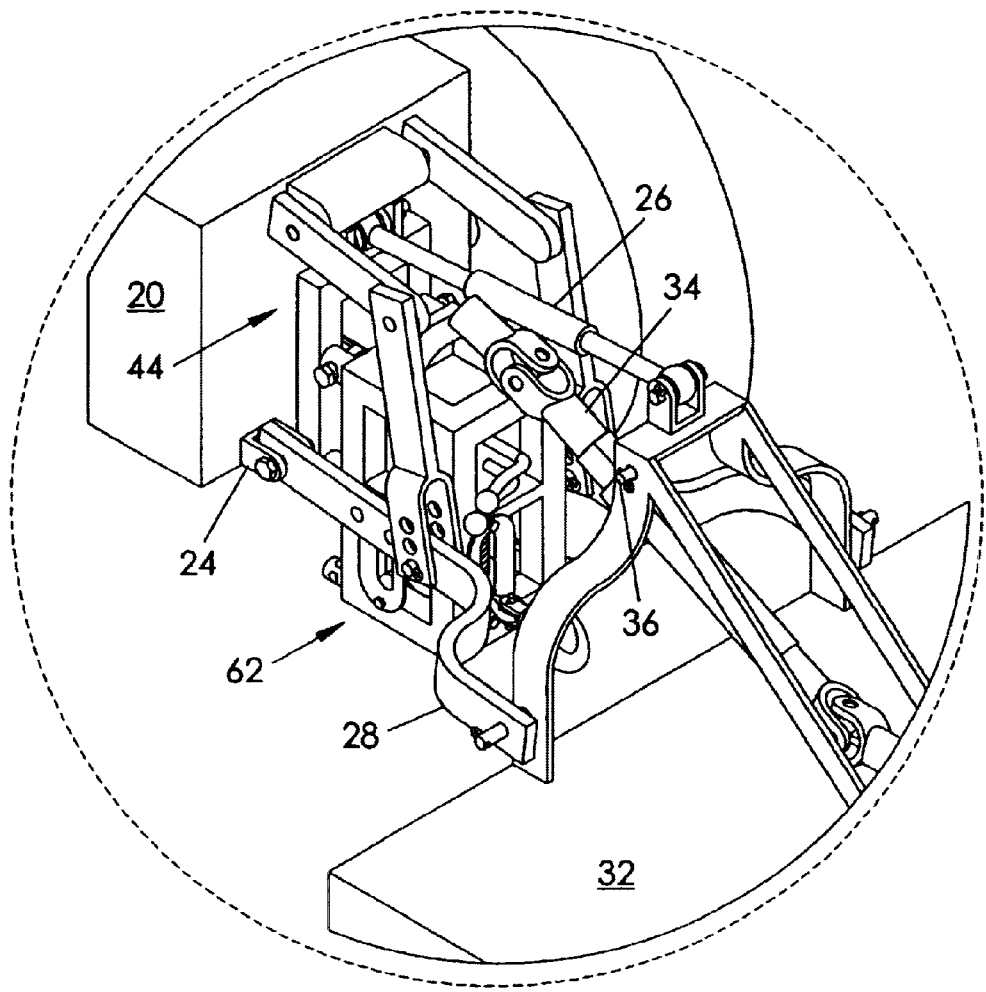
FIG. 8B is an isolated perspective view on an enlarged scale of said implement coupled to the tractor as in FIG. 8A showing its driveshaft disconnected from the tractor's PTO.
Figure 8A:
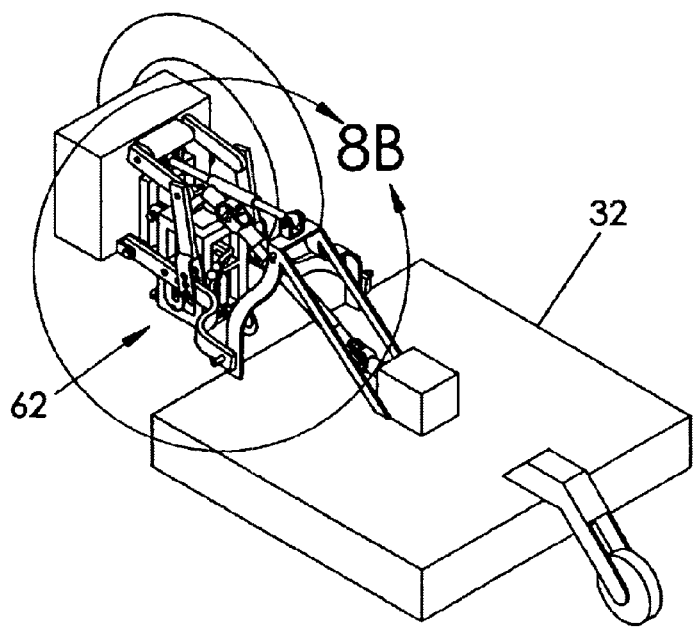
FIG. 8A is a perspective view of the winch assembly as in FIG. 1 with an implement coupled to the tractor.

In use, the winch frame 62 may be releasably coupled to the storage frame 92 when use of the winch is not needed. For example, the winch frame 62 may be carried at a storage configuration displaced from the rear portion 20 of the tractor while an accessory 32 or implement is in use by the tractor. When the winch is needed, the driveshaft 34 of the accessory 32 is disconnected from the PTO 30 of the tractor but the accessory 32 itself need not be uncoupled from the tractor's three point hitch (FIG. 8B). It is understood that the accessory driveshaft 34 may be held out of the way with a pin 36, bracket, or other suitable holding mechanism. Then, the winch frame 62 may be released from the storage frame 92 and coupled to the mounting frame 44 at a desired orientation depending on the intended use of the winch and expected load forces. It is understood that the winch framework does not interfere or inhibit connection of the accessory 32 to the tractor.

The freespool lever 90 may be manipulated to allow the cable 80 to be freely extended from the cable-reel 78 so that the hook 82 at its free end may be secured to a distant object. The primary PTO connector 86 of the winch gear linkage may be coupled to the tractor's PTO 30 such that an operation thereof causes the cable 80 to retract about the cable-reel 78. Use of the clutch lever 88 engages or disengages rotation of the cable-reel 78 while the PTO is engaged so as to provide control over the overall winching operation, whether the operation is pulling the tractor itself out of the mud or pulling another object, e.g. a log, to the tractor. When the operation is completed, the winch frame 62 may be released from the mounting frame 44 and coupled again to the storage frame 92. Then, the driveshaft 34 of the accessory 32 may be reconnected to the tractor's PTO 30 and operation thereof may be resumed.

Figure 9:
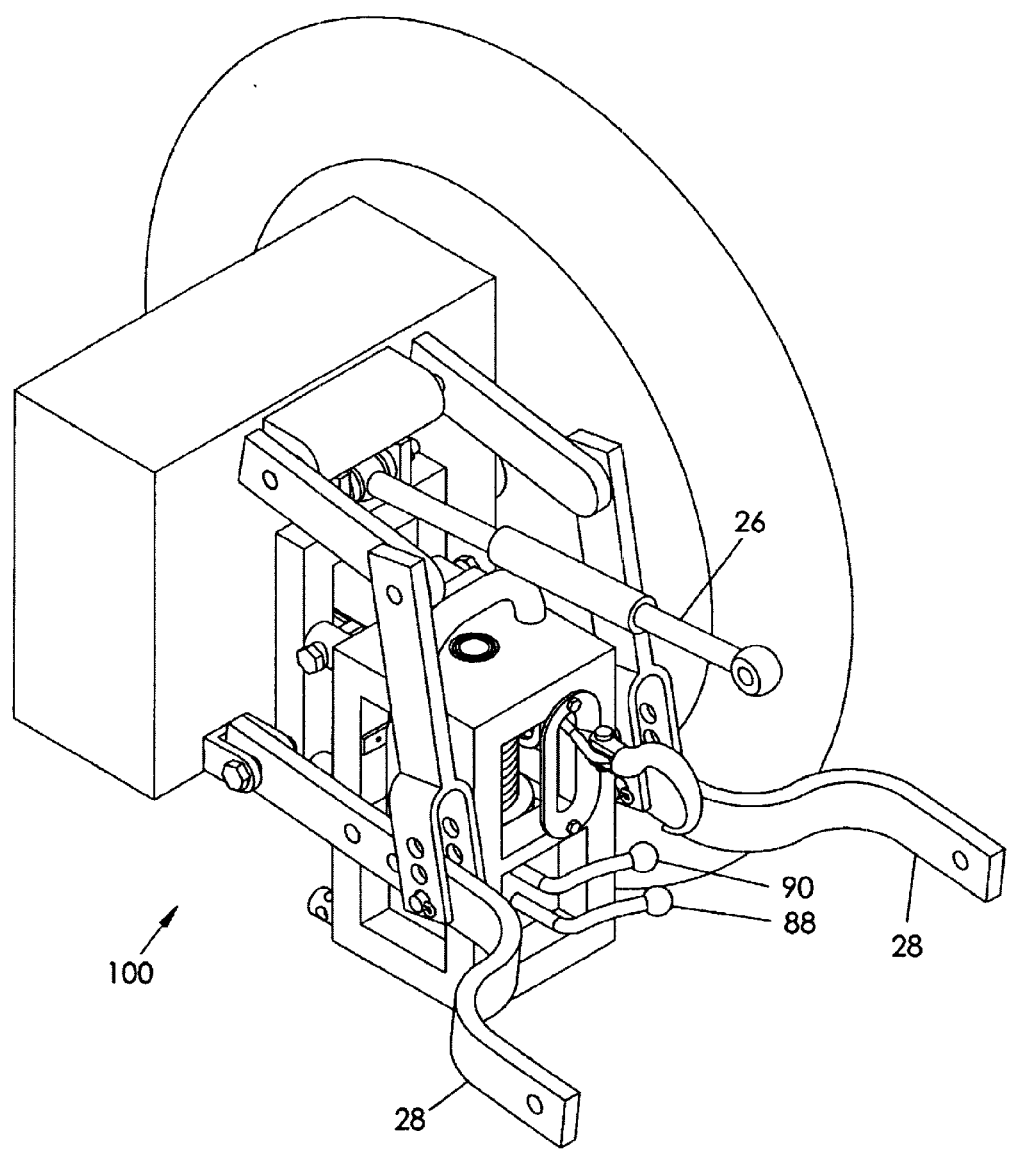
FIG. 9 is a perspective view of a winch assembly according to another embodiment of the present invention.
Figure 10:
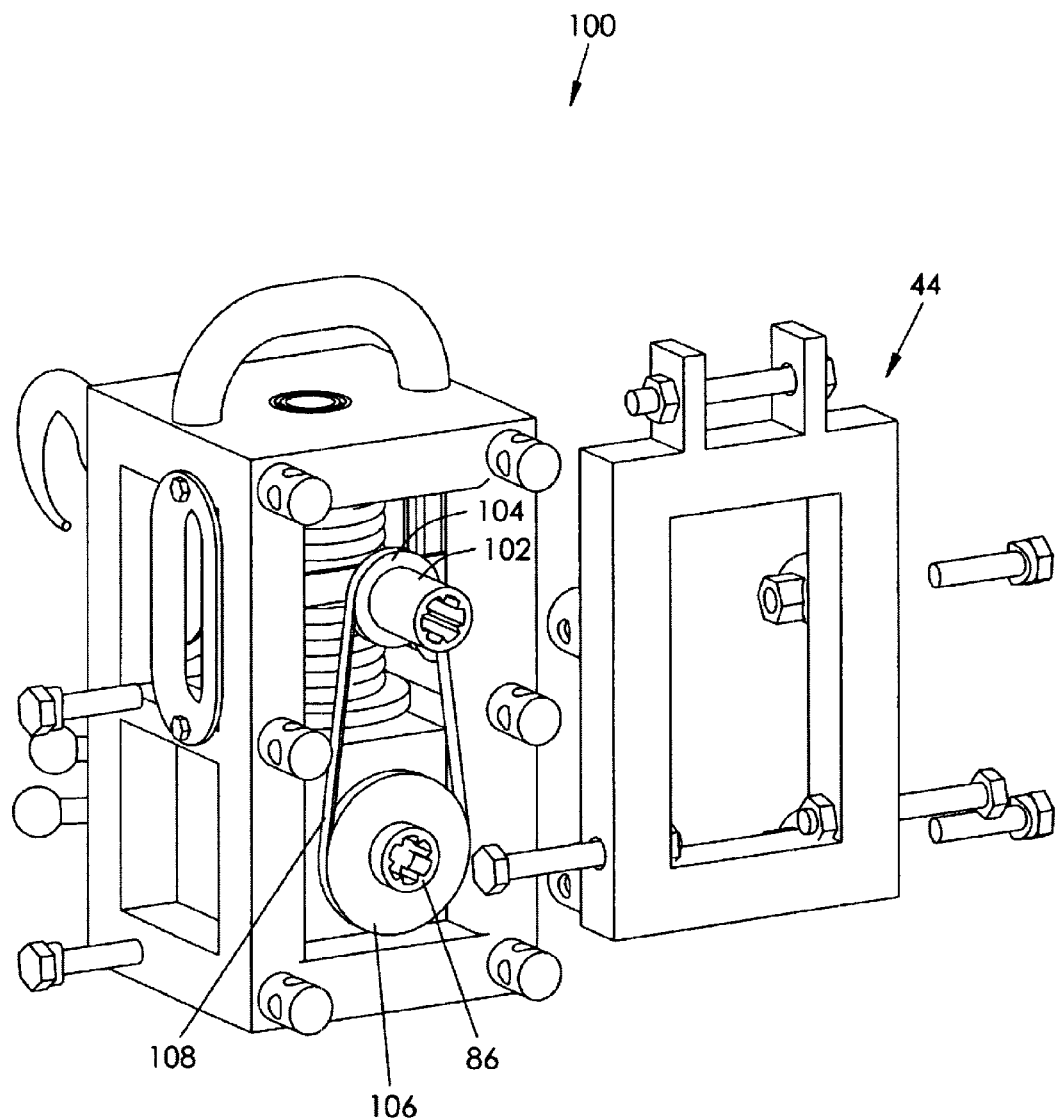
FIG. 10 is an exploded view from a reverse angle of the winch assembly as in FIG. 9.

A winch assembly 100 according to another embodiment of the present invention is shown particularly in FIGS. 9 and 10 and includes a construction substantially similar to the construction described above except as specifically noted below. The winch assembly 100 provides for a "cable-reel centered" configuration. In other words, the cable-reel 78 may be positioned intermediate the high and low configurations described previously which is advantageous when certain load forces are encountered. This winch assembly 100 includes a pulley assembly having an auxiliary PTO connector 102 that may be releasably connected to the tractor's PTO for rotation thereby. The pulley assembly further includes an auxiliary pulley 104, a primary pulley 106, and a belt 108 for correspondingly rotating the primary PTO connector 86 upon a rotation of the tractor's PTO (FIG. 10). In operation, operation of the PTO 30 causes the auxiliary PTO connector 104 to rotate which, in turn, causes the primary PTO connector 86 to rotate which, in turn, drives the gear linkage and cable-reel 78 to rotate.

Figure 11:
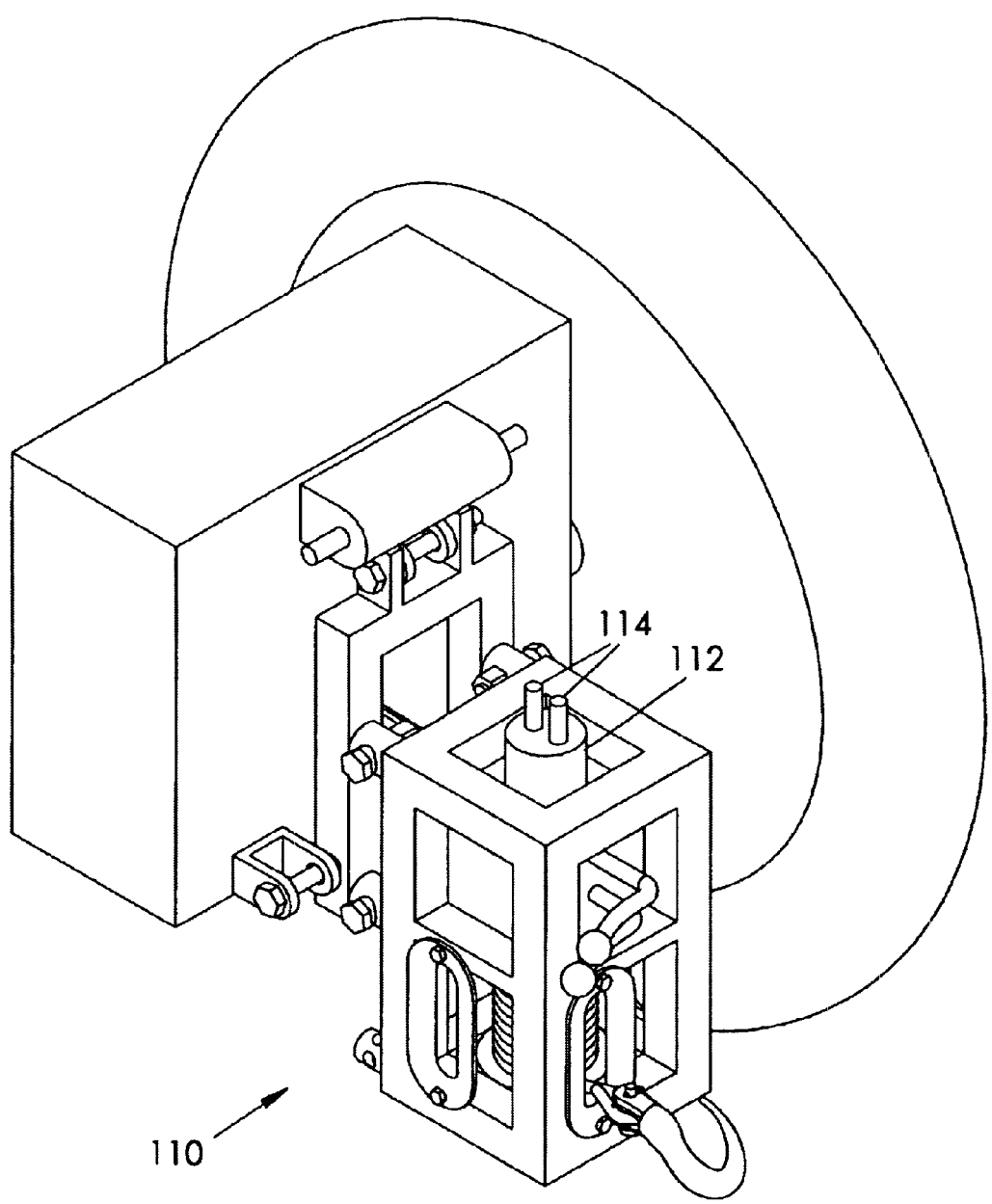
FIG. 11 is a perspective view of a winch assembly according to still another embodiment of the present invention.
Figure 12:
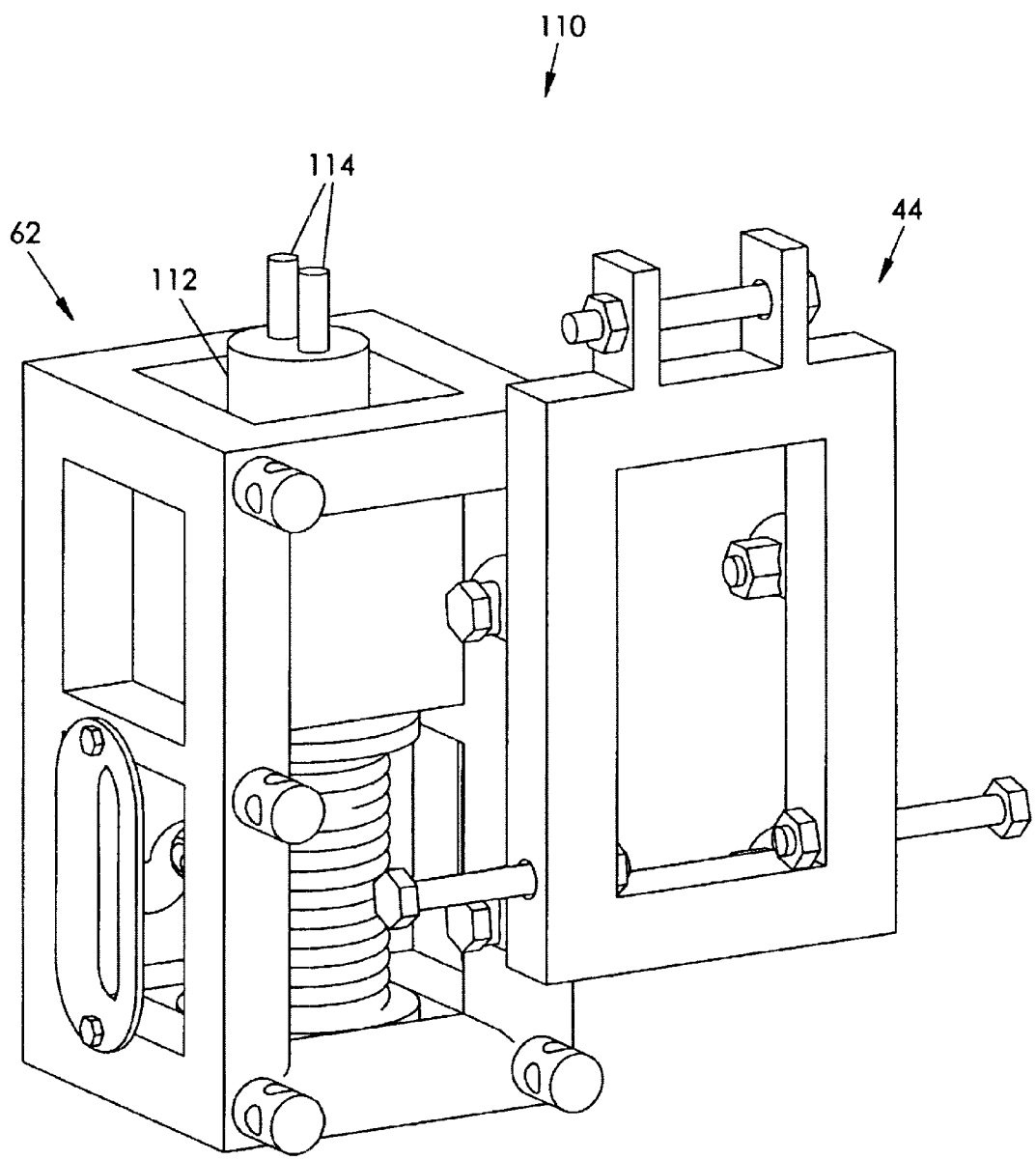
FIG. 12 is a perspective view on an enlarged scale of the winch assembly as in FIG. 11 with the tractor removed.

A winch assembly 110 according to still another embodiment of the present invention is shown in FIGS. 11 and 12 and includes a construction substantially similar to the construction first described above except as specifically noted below. Instead of a PTO connector 86, the winch assembly 110 according to this embodiment includes a hydraulic motor 112 and conventional linkage for rotating the cable-reel 78. The hydraulic motor 112 includes quick-connectors 114 to the hydraulic lines of a tractor (FIG. 12).

Accordingly, the winch assembly of the present invention provides a versatile winch that can be mounted on a tractor without interfering with normal tractor implement usage and that may be configured for optimal and safe usage in many different situations.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A winch assembly for use with a farm type tractor having a power take off ("PTO") and an implement linkage, said implement linkage being mounted to a rear portion of said tractor and capable of releasable connection to an implement, said winch assembly comprising:
   a winch framework releasably attached to said rear portion of said tractor and positioned so as not to obstruct a connection of said implement linkage to said implement;
   a cable-reel rotatably mounted to said winch framework and having means for releasably coupling said cable-reel to said PTO for rotatably driving said cable-reel so as to selectively unwind a cable therefrom and retract said cable thereabout, said cable having fastening means at a free end thereof for attaching said free end to objects;
   wherein said framework includes:
       a winch frame having a pair of rear support members and a pair of front support members with a plurality of struts extending between respective rear and front support members, said winch frame having a plurality of bosses fixedly attached to and spaced apart along said rear support members; and
       a mounting frame having a pair of spaced apart side frame bars with upper and lower frame bars connecting said pair of side frame bars, said upper frame bar being releasably coupled to said rear portion of said tractor, said mounting frame having a plurality of couplings fixedly attached to said side frame bars for releasably receiving and retaining respective bosses therein.

2. The winch assembly as in claim 1 wherein said winch frame includes at least one fairlead extending between respective struts for directing said cable about said cable-reel.

3. The winch assembly as in claim 1 further comprising at least one handle fixedly attached to respective struts of said winch frame for transporting said winch frame.

4. The winch assembly as in claim 1 wherein said means for releasably coupling said cable-reel to said PTO includes a gearbox positioned in said winch framework and having a primary PTO connector for releasable connection to said PTO, said gearbox being rotatably coupled to said cable-reel for driving said cable-reel to selectively unwind or retract said cable upon an operation of said PTO.

5. The winch assembly as in claim 4 further comprising a pulley assembly, said pulley assembly having an auxiliary PTO connector adapted to be releasably connected to said PTO for rotation thereby, said auxiliary PTO connector being spaced from said primary PTO connector and rotatably connected thereto with a belt such that said primary PTO connector and said cable-reel are rotated upon a rotation of said auxiliary PTO connector.

6. The winch assembly as in claim 4 wherein said gearbox includes:

a worm gear linking said cable-reel to said primary PTO connector for non-backdrivable operation of said cable-reel;

a line force clutch adapted to selectively engage and disengage said worm gear from said primary PTO connector; and means for releasing said worm gear from said cable-reel for allowing said cable-reel to rotate freely.

7. The winch assembly as in claim 1 further comprising means for releasably coupling said winch framework to said tractor at a location displaced from said rear portion thereof.

8. The winch assembly as in claim 1 further comprising a storage frame mounted to said tractor at a location displaced from said rear portion thereof and having another plurality of couplings fixedly attached thereto, said another plurality of couplings being positioned so as to releasably receive and retain respective bosses of said winch frame, whereby to selectively hold said winch frame in a storage configuration when not in use.

9. A winch assembly for use with a farm type tractor having a power take off ("PTO") and a three point hitch, said three point hitch being releasably mounted to a plurality of hitch brackets fixedly attached to a rear portion of said tractor, said three point hitch being capable of releasable attachment to an implement, said winch assembly comprising:

a winch framework releasably attached to said plurality of hitch brackets on said tractor and positioned between said plurality of hitch brackets so as not to obstruct a connection of said three point hitch to said implement;

a cable-reel rotatably mounted to said winch framework and releasably coupled to said PTO with a gear linkage for rotatably driving said cable-reel so as to selectively unwind a cable therefrom and retract said cable thereabout, said cable having fastening means at a free end thereof for attaching said free end to objects;

wherein said framework includes:

a winch frame having a pair of rear support members and a pair of front support members with a plurality of struts extending between respective rear and front support members, said winch frame having a plurality of bosses fixedly attached to said rear support members; and a mounting frame having a pair of spaced apart side frame bars with upper and lower frame bars connecting said pair of side frame bars, said upper frame bars being releasably coupled to an upper hitch bracket of said plurality of hitch brackets and said pair of side frame bars being releasably coupled to corresponding side hitch brackets of said plurality of hitch brackets, said mounting frame having a plurality of couplings fixedly attached to said side frame bars for receiving and releasably retaining respective bosses.

10. The winch assembly as in claim 9 wherein said gear linkage includes a primary PTO connector adapted to releasably connect to said PTO, said gear linkage interconnecting said primary PTO connector and said cable-reel so as to drive said cable-reel to selectively unwind or retract said cable upon a respective operation of said PTO.

11. The winch assembly as in claim 9 wherein said gear linkage includes:

a worm gear linking said cable-reel to said primary PTO connector for non-backdrivable operation of said cable-reel;

a line force clutch adapted to selectively engage and disengage said worm gear from said primary PTO connector; and means for releasing said worm gear from said cable-reel for allowing said cable-reel to rotate freely.

12. The winch assembly as in claim 9 wherein said winch frame includes:

at least one fairlead extending between respective struts for directing said cable about said cable-reel; and at least one handle fixedly attached to respective struts for transporting said winch frame.

13. The winch assembly as in claim 9 further comprising a storage frame mounted to said tractor at a location displaced from said rear portion thereof and having another plurality of couplings fixedly attached thereto, said another plurality of couplings being configured so as to releasably receive and retain respective bosses of said winch frame, whereby to selectively hold said winch frame in a storage configuration when not in use.

14. The winch assembly as in claim 9 further comprising a pulley assembly, said pulley assembly having an auxiliary PTO connector adapted to be releasably connected to said PTO for rotation thereby, said auxiliary PTO connector being spaced from said primary PTO connector and rotatably connected thereto with a belt such that said primary PTO connector and said cable-reel are rotated upon a rotation of said auxiliary PTO connector.

15. A winch assembly for use with a farm type tractor having a power take off ("PTO") and a three point hitch, said three point hitch being releasably mounted to an upper hitch bracket and a pair of laterally spaced apart side hitch brackets that are fixedly attached to a rear portion of said tractor, said three point hitch being capable of releasable attachment to an implement, said winch assembly comprising:

a winch frame having a pair of rear support members and a pair of front support members with a plurality of struts extending between respective rear and front support members, said winch frame having a plurality of bosses fixedly attached to said rear support members;

a mounting frame having a pair of spaced apart side frame bars with upper and lower frame bars connecting said pair of side frame bars, said upper frame bars being releasably coupled to said upper hitch bracket and said pair of side frame bars being releasably coupled to corresponding side hitch brackets, said mounting frame having a plurality of couplings fixedly attached to said side frame bars for receiving and releasably retaining respective bosses, said winch and mounting frameworks being configured so as not to obstruct a connection between said three point hitch and said implement; and a cable-reel rotatably mounted to said winch frame and releasably coupled to said PTO with a gear linkage for rotatably driving said cable-reel so as to selectively unwind a cable therefrom and retract said cable thereabout, said cable having fastening means at a free end thereof for attaching said free end to objects.

16. The winch assembly as in claim 15 wherein said gear linkage includes a primary PTO connector adapted to be releasably connected to said PTO, said gear linkage interconnecting said primary PTO connector and said cable-reel whereby said cable-reel is driven to selectively unwind or retract said cable by a respective operation of said PTO.

17. The winch assembly as in claim 15 further comprising a pulley assembly, said pulley assembly having an auxiliary PTO connector adapted to be releasably connected to said PTO for rotation thereby, said auxiliary PTO connector being spaced from said primary PTO connector and rotatably connected thereto with a belt such that said primary PTO connector and said cable-reel are rotated upon a rotation of said auxiliary PTO connector.

18. The winch assembly as in claim 15 further comprising a storage frame mounted to said tractor at a location displaced from said rear portion thereof and having another plurality of couplings fixedly attached thereto, said another plurality of couplings being configured so as to releasably receive and retain respective bosses of said winch frame, whereby to selectively hold said winch frame in a storage configuration when not in use.

* * * * *